United States Patent Office 3,538,129
Patented Nov. 3, 1970

3,538,129
NEW DISPERSE ANTHRAQUINONE DYESTUFFS
Yosuke Sato and Noboru Kishi, Kitakyushu-shi, Japan, assignors to Mitsubishi Chemical Industries Limited, a corporation of Japan
No Drawing. Continuation-in-part of application Ser. No. 542,447, Apr. 14, 1966. This application Dec. 4, 1968, Ser. No. 781,249
Claims priority, application Japan, Apr. 17, 1965, 40/22,406
Int. Cl. C09b *1/54*
U.S. Cl. 260—376     8 Claims

ABSTRACT OF THE DISCLOSURE

Dyestuffs of the following formula:

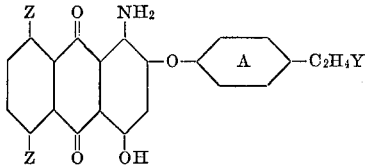

wherein A denotes a benzene nucleus which may have a substituent selected from the class consisting of chlorine atom and methyl group; Y denotes a cyano group of a group as indicated by the general formula —$COR_1$— in which $R_1$ is a hydroxy group, amino group, lower alkoxy group having one to four carbon atoms, or cyclohexyloxy group; at least one of the Z's being hydrogen and the other hydrogen or halogen, when both Z's are hydrogen, Y is a group other than cyano group. Such dyestuffs are particularly suited for dyeing polyester fibrous materials.

---

This application is a continuation-in-part of Ser. No. 542,447, filed Apr. 14, 1966, now abandoned.

The invention relates to new disperse anthraquinone dyestuffs. More particularly, the invention relates to new disperse anthraquinone dyestuffs which are suitable for colouring textile materials of polyester-, polyacrylonitrile-, polyamide-, cellulose ester-, and polymer type.

An object of the invention is the provision of new disperse anthraquinone dyestuffs which give textile materials reddish shades of good fastness to light, washing and especially to sublimation.

Another object of the invention is the provision of a method by which such new disperse anthraquinone dyestuffs are produced with economy.

Other objects and advantages of the invention will be apparent from the following description.

The new disperse anthraquinone dyestuffs of the present invention are indicated by the general Formula I as follows:

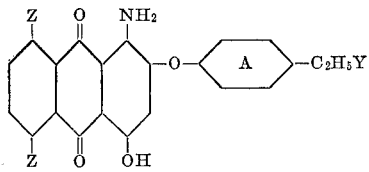

(I)

in which A denotes a benzene nucleus which may have a substituent other than sulfo-group and carboxy-group; Y denotes a cyano group or a group as indicated by the general formula —$COR_1$— in which $R_1$ denotes a group selected from the class consisting of hydroxy group, amino group, substitutable lower alkylamino group, lower alkylamino group with two to three carbon atoms and having a methoxy group, amino group, or hydroxy group as a substituent; dihydroxy ethylamino group; benzylamino group, morpholino group; substitutable lower alkoxy group; lower alkoxy group with two to three carbon atoms and having a hydroxy group, methoxy group, ethoxy group, hydroxyethoxy group, cyano group or phenoxy group as a substituent; phenethyloxy group, benzyloxy group, cyclohexylamino group, and cyclohexyloxy group; at least one of the Z's is hydrogen and the other denoted hydrogen, halogen or a group as indicated by the general formula:

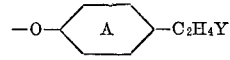

and when both Z's are hydrogen, Y denotes a group other than cyano group. A is preferably chlorine or methyl.

The terms "substitutable lower alkylamino group" and "substitutable lower alkoxy group" referred to in this specification mean such an alkylamino group and an alkoxy group respectively which has 1 to 4 carbon atoms and which may be substituted.

The new disperse anthraquinone dyestuffs of the invention are exemplified by the following Formulae II and III:

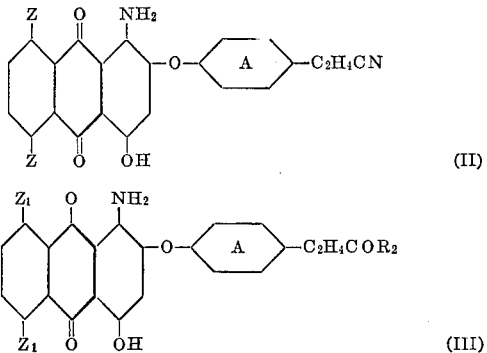

In the Formula II, one of the two Z's denotes a hydrogen atom while the other denotes a halogen atom or a group as indicated by the general formula:

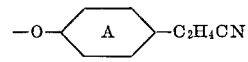

and in the Formula III, each $Z_1$ denotes a hydrogen atom, or one $Z_1$ denotes a hydrogen atom while the other denotes either a halogen atom or a group as indicated by the general formula:

in which $R_2$ denotes a group selected from the class consisting of hydroxy group, amino group, substitutable lower alkylamino group, lower alkylamino group with two to three carbon atoms and having a methoxy group, amino group, or hydroxy group as a substituent; dihydroxy ethylamino group; benzylamino group, morpholino group; substitutable lower alkoxy group, lower alkoxy group with two to three carbon atoms and having a hydroxy group, methoxy group, ethoxy group, hydroxyethoxy group, cyano group or phenoxy group as a substituent; phenethyloxy group, benzyloxy group, cyclohexyl amino group and cyclohexyloxy group.

In the preferred compound, one $Z_1$ is hydrogen and the other is hydrogen or chlorine and $R_2$ is hydroxy or amino.

In another preferred embodiment, the other $Z_1$ is hydrogen, chlorine or bromine and $R_2$ is ethoxy, methoxy, cyclohexyloxy, isopropoxy and phenethyloxy.

In the Formulae II and III, benzene nucleus A may have a substituted group other than sulfo group and carboxy group which may be a lower alkyl group, a lower alkoxy group, or a halogen atom and is preferably chlorine or methyl.

The industrial manufacture of the new disperse anthraquinone dyestuffs as indicted by the aforementioned general Formula I are carried out by various processes which include the following ones:

(1) Among the new disperse anthraquinone dyestuffs of the invention, the dyestuffs having the general Formula II are produced by reacting an anthraquinone compound of the following Formula IV:

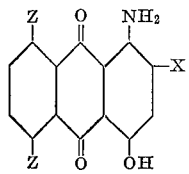

(IV)

in which one of two Z's denotes a hydrogen atom while the other denotes a halogen atom and X denotes a halogen atom, a sulfo group with a β-(4-hydroxyphenyl)-propionitrile of the following general Formula V:

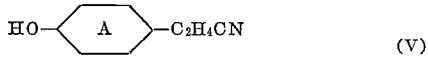

(V)

in which A is the same as A in the general Formula I in the presence of a weak acid alkali metal salt such as carbonate, bicarbonate or acetate in substantially dry state at a temperature from 100° C. to 250° C. In case the reaction takes place at a temperature in the range 100° C.–160° C., substantial portion of the resulting dyestuff will be a dyestuff or the following general Formula VI:

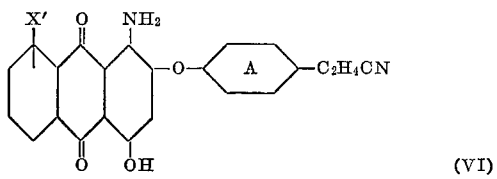

(VI)

in which X' denotes a halogen atom and in case the reaction takes place at a temperature in the range 160° C.–250° C., the resulting dyestuff will be a dyestuff of the following general Formula VII:

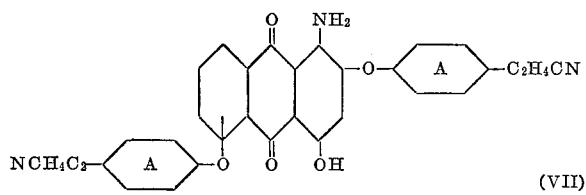

(VII)

or a mixture of this dyestuff and a dyestuff having the aforementioned general Formula VI. The reaction may be carried out in an inactive solvent such as chlorobenzene or in an excess amount of a phenol type reaction component as indicated by the aforementioned general Formula V.

(2) The new disperse anthraquinone dyestuffs having the general Formula III of the invention are produced by the following methods:

(a) An anthraquinone compound of the following general Formula VIII:

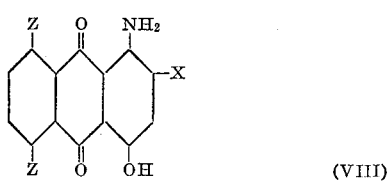

(VIII)

in which each of two Z's denotes a hydrogen atom, or one of the two denotes a hydrogen atom while the other denotes a halogen atom and X is the same as in the general Formula IV reacts with a phenol compound of the following general Formula IX:

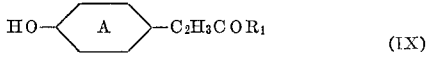

(IX)

in which A is the same as in the general Formula I and $R_1$ is the same as in the general Formula III, under the same conditions as in the manufacture of the new disperse anthraquinone dyestuffs having the general Formula II. The employment of a reaction temperature in the range 100°C.–160° C. results in dyestuffs which correspond to the respective starting material anthraquinone compounds having the following general Formula X or X':

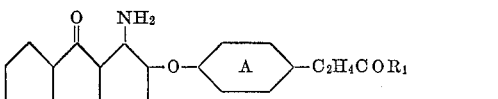

(X)

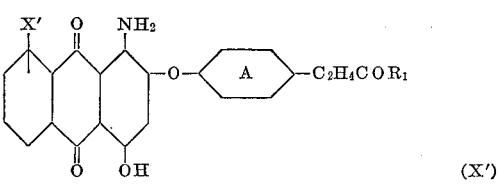

(X')

in which X' denotes a halogen atom.

In case an anthraquinone compound of the general Formula VIII in which one of two Z's is a halogen atom is employed as starting material for the reaction at a temperature from 160° C. to 250° C., the resulting dyestuff will be a dyestuff of the following general Formula XI:

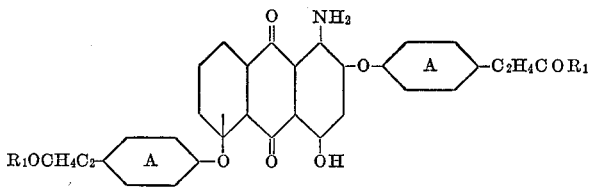

or a mixture of this dyestuff and a dyestuff having the general Formula X'.

(b) The new disperse anthraquinone dyestuffs of the invention having the general Formula III in which $R_1$ is an alkoxy group which may be substituted may be manufactured by reacting respective anthraquinone compounds of the following general Formula XII:

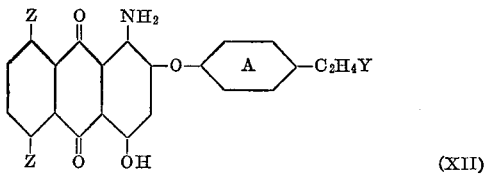

(XII)

in which Y denotes a cyano-, carbamoyl-, or carboxy group and each of two Z's denotes a hydrogen atom, or one of them denotes a hydrogen atom while the other denotes either a halogen atom or a group of the general formula

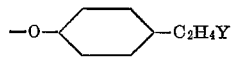

and benzene nucleus A is the same as in the general Formula I with a compound as indicated by the general formula R·OH, R denoting a lower alkyl group, which may be substituted in the presence of hydrogen halide, sulfuric acid, benzene sulphonic acid, or naphthalene sulfonic acid at a temperature from 50° C. to 200° C.

(c) The new disperse anthraquinone dyestuffs of the invention having the general Formula III in which $R_1$ is a hydroxy group or an amino group may also be manufactured by heating the dyestuffs of the invention having the general Formula II together with a mineral acid such as hydrochloric acid or sulfuric acid, or an alkali hydroxide solution at a temperature from 30° C. to 150° C.

(d) The new disperse anthraquinone dyestuffs of the invention having the general Formula III in which $R_1$ is an amino group or a lower alkylamino group may also be manufactured by reacting the respective anthraquinone compounds of the following general Formula XIII:

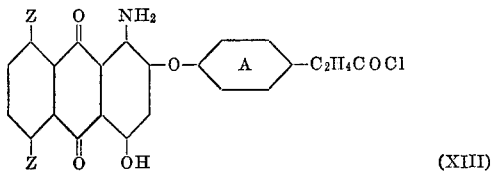

(XIII)

in which each of two Z's denotes a hydrogen atom, or one of them denotes a hydrogen atom while the other denotes either a halogen atom or a group of the general formula

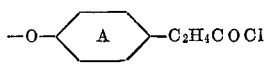

and benzene nucleus A is the same as in the general Formula I with ammonia, or primary or secondary alkylamines while heating in the presence of an organic base such as pyridine or dialkylaniline.

The anthraquinone compounds of the general Formula IV and VIII to be employed as the starting materials for the manufacture of the new disperse anthraquinone dyestuffs of the invention include:

1-amino-2-halogeno-4-hydroxy-anthraquinone,
1-amino-4-hydroxy-anthraquinone-2-sulfonic acid,
1-amino-2,5-dihalogeno-4-hydroxy-anthraquinone,
1-amino-2,8-dihalogeno-4-hydroxy-anthraquinone,
1-amino-5-halogeno-4-hydroxy-anthraquinone-2-sulfonic acid, and, more particularly, 1-amino-2-bromo-4-hydroxy-anthraquinone,
1-amino-2-chloro-4-hydroxy-anthraquinone,
1-amino-4-hydroxy-anthraquinone-2-sulfonic acid,
1-amino-2,5-dichloro-4-hydroxy-anthraquinone,
1-amino-2,5-dibromo-4-hydroxy-anthraquinone,
1-amino-2-bromo-5-chloro-4-hydroxy-anthraquinone,
1-amino-2,8-dibromo-4-hydroxy-anthraquinone,
1-amino-2-chloro-8-bromo-4-hydroxy-anthraquinone,
1-amino-2-bromo-8-chloro-4-hydroxy-anthraquinone,
1-amino-5-chloro-4-hydroxy-anthraquinone-2-sulfonic acid, and
1-amino-8-bromo-4-hydroxy-anthraquinone-2-sulfonic acid.

The phenol compounds containing substituted ethyl group of the general Formulae V and IX which are employed as starting material for the manufacture of the new disperse anthraquinone dyestuffs according to the invention include:

β-(4-hydroxyphenyl)-propionitrile,
β-(4-hydroxyphenyl)-propionic acid,
β-(4-hydroxyphenyl)-propion amide,
β-(4-hydroxyphenyl)-propion alkylamide,
β-(4-hydroxyphenyl)-propion aralkylamide,
β-(4-hydroxyphenyl)-propion cycloalkylamide,
β-(4-hydroxyphenyl)-propion dialkylamide,
β-(4-hydroxyphenyl)-propion alkylester,
β-(4-hydroxyphenyl)-propion cycloalkylester,
β-(4-hydroxyphenyl)-propion aralkylester, and compounds such that the benzene nucleus of the abovementioned compounds may have a substituted group other than sulfo group and carboxy group which may be a lower alkyl group, lower alkoxy group, phenyl group, cyclohexyl group, or a halogen atom and, more particularly, β-(2-methyl-4-hydroxyphenyl)-propionamide,
β-(3-cyclohexyl-4-hydroxyphenyl)-propionamide,
β-(4-hydroxyphenyl)-propion ethylamide,
β-(4-hydroxyphenyl)-propion dimethylamide,
β-(2-chloro-4-hydroxyphenyl)-propion methoxy propylamide,
β-(4-hydroxyphenyl)-propion phenethylamide,
β-(3-methyl-4-hydroxyphenyl)-propion cyclohexylamide,
β-(4-hydroxyphenyl)-propion morpholide,
β-(4-hydroxyphenyl)-propionic acid methylester,
β-(3-methyl-4-hydroxyphenyl)-propionic acid butylester,
β-(4-hydroxyphenyl)-propionic acid hydroxyethylester,
β-(3-chloro-4-hydroxyphenyl)-propionic acid phenoxypropylester,
β-(2-methoxy-4-hydroxyphenyl)-propionic acid cyclohexylester,
β-(4-hydroxyphenyl)-propionic acid benzylester, and
β-(3-phenyl-4-hydroxyphenyl)-propionic acid ethylester.

The process of colouring with the dyestuffs of the invention synthetic fibers such as polyester fibers, cellulose ester fibers, polyamide fibers, or other textile materials made of synthetic polymer comprises mixing one kind or more of the disperse anthraquinone dyestuff having the general Formula I and dispersing said dyestuff or dyestuffs in an aqueous medium in conventional manner to make up a dye bath or to prepare a printing paste for employment in dip dyeing or textile printing.

For example, dip dyeing comprises making up a dye bath of a dispersion of an anthraquinone dye of the general (I) which corresponds to a desired colouring concentration, and performing colouring at a temperature from 80° C. to 130° C. which conforms to the properties of textile material to be coloured for a period from 60 minutes to 120 minutes, followed by conventional soaping.

In the preparation of dye bath or printing paste, a dispersing agent such as a condensate of naphthalene sulfonic acid and formaldehyde, a condensate of cresol, hydroxynaphthalene sulfonic acid and formaldehyde or a condensate of a lower alcohol and naphthalene sulfonic acid may be present, and a dyeing assistant such as phenylphenol, chlorobenzene, oxybenzoic acid ester, benzene dicarbonic acid ester or phenyl methly carbinol may also be present, as the case may be.

The dyestuffs in accordance with the invention are capable of dyeing synthetic fibers such as polyester fibers, cellulose ester fibers, polyamide fibers, polyacrylonitrile textile materials and other textile materials made from synthetic polymer to red or bluish red shades of good fastness to light, sublimation and washing, especially are capable of dyeing polyester fibers to red or bluish red shades of excellent fastness to light and sublimation.

The shades of fibrous materials coloured by the dyestuffs according to the invention are especially excellent in the fastness to sublimation as compared with those given by conventional dyestuffs of the following general formula:

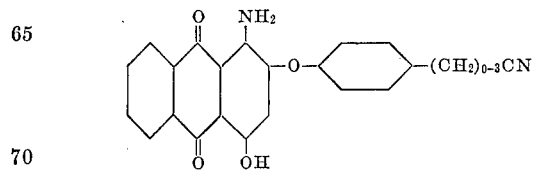

For example, whilst the fastness to sublimation of the shades given by the abovementioned conventional dyestuffs to the fibrous materials indicates about fourth grade or less with a noticeable staining by sublimation, the fastness to sublimation given by the dyestuffs of the invention indicates about fifth grade substantially without staining by sublimation.

Further, the dyestuffs according to the invention give fibrous materials a wide range of reddish shades from red to bluish red whereas the conventional dyestuffs give only reddish shades.

Some preferred embodiments of the invention will now be described in the following only for the illustrative purposes and not for the limiting purpose in which the parts are parts by weight.

EXAMPLE 1

A mixture of 156 parts of β-(4-hydroxyphenyl)-propion amide, 145 parts of nitrobenzene and 26.1 parts of potassium carbonate was heated at 130° C. under stirring for 2 hours, and 100 parts of 1-amino-2-bromo-4-hydroxy anthraquinone were added thereto for further heating at 155° C. under stirring for 25 hours. Upon completion of the reaction, the resulting solutions was cooled, and 3.7 parts of acetic acid were added while stirring to neutralize excess potassium charbonate, and subjected to steam distillation to drive off nitro benzene. The precipitate was filtered off, washed with methanol, further washed with water and dried to obtain 115 parts of 1-amino-2-(4'-carbamolyethyl - phenoxy)-4-hydroxy - anthraquinone.

Similar results were obtained when 1-amino-2-chloro-4-hydroxy-anthraquinone and 1-amino - 4 - hydroxy-anthraquinone-2-sulfonic acid sodium salt respectively were used in place of 1-amino-2-bromo-4-hydroxy anthraquinone.

This product was recrystallized from chlorobenzene to obtain a refined product which had a melting point of 243–244° C., indicating maximum absorption wave length at 516 mμ and 552 mμ.

The dyestuffs in a dispersion dyed synthetic fibers such as polyester fiber under pressure at 120° C. to brilliant red shades of good fastness to light and sublimation.

EXAMPLE 2

The same process of Example 1 was followed to effect condensation of anthraquinone compounds indicated under column A and phenol compounds indicated under column B in the following Table I to obtain 2-substituted phenoxy-anthraquinone dyestuffs respectively.

These dyestuffs dyed synthetic fibers to red to bluish red shades of good fastness to light and sublimation.

The melting point and maximum absorption wave length of the dyestuffs are indicated under columns C and D respectively while the shades given by the dyestuffs to synthetic fibers are shown under column E.

TABLE 1

| A | B | C °C. | D mμ | E |
|---|---|---|---|---|
| 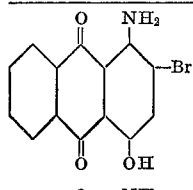 | 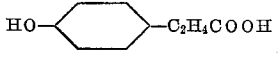 | >285 | 515–550 | Brilliant red (Acetate); |
| 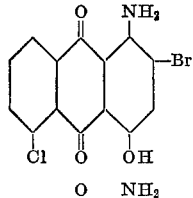 | 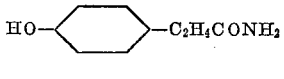 | 268–273 | 525–561 | Bluish red (Acetate); |
| 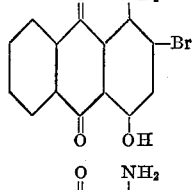 | 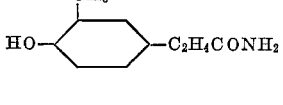 | 233.4–234.4 | 513–550 | Brilliant red (Polyester); |
| 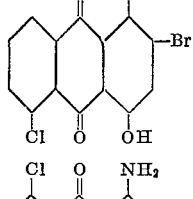 | 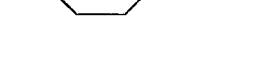 | >285 | 526–562 | Bluish red (Polyester); |
| 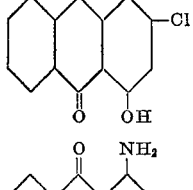 |  | 271.5–274.5 | 525–558 | Do. |
| 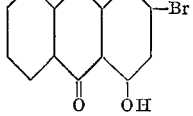 | 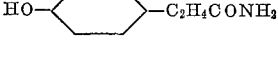 | 258–260 | 516–551 | Brilliant red (Polyester). |

TABLE 1

| A | B | C °C. | D mμ | E |
|---|---|---|---|---|
| Same as above | HO—⟨C₆H₃(CH₃)⟩—C₂H₄CONH₂ | 215–218 | 514–549 | Brilliant red (Polyester). |
| Do | HO—⟨⟩—C₂H₄CONH₄H₉ | 226.3–229.3 | 526–560 | Brilliant red (Acetate). |
| Do | HO—⟨⟩—C₂H₄CONH—⟨H⟩ | 261.4–263.4 | 526–561 | Brilliant red (Polyester). |
| Do | HO—⟨⟩—C₂H₄CONHC₃H₆(OCH₃) | 216.5–218.5 | 524–560 | Brilliant red (Polyamide). |
| 1-amino-2-bromo-4-hydroxyanthraquinone (with Cl) | HO—⟨⟩—C₂H₄CN | 219–223 | 524–560 | Bluish red (Polyester). |
| Cl-anthraquinone-Br-OH | HO—⟨⟩—C₂H₄CN | 216–219 | 525–560 | Do. |
| anthraquinone-SO₃Na | HO—⟨⟩—C₂H₄CONHCH₃ | 233–235 | 520–555 | Brilliant red (Polyester). |
| anthraquinone-Br | HO—⟨⟩—C₂H₄CONHCH₂CH₂NH₂ | ¹220 | 522–560 | Bluish red (Polyester). |
| Same as above | HO—⟨⟩—C₂H₄CONHCH₂—⟨⟩ | 239–241 | 524–560 | Brilliant red (Polyester). |
| Do | HO—⟨⟩—C₂H₄CONHCH₂CH₂OH | ¹247 | 525–561 | Do. |
| Do | HO—⟨⟩—C₂H₄CON(C₂H₄OH)₂ | 182–184 | 526–561 | Do. |
| anthraquinone-Cl | HO—⟨⟩—C₂H₄CON(C₂H₄)₂O | 152–154 | 523–554 | Do. |

¹ Decomposed.

EXAMPLE 3

A mixture of 196 parts of β-(3-methyl-4-hydroxyphenyl-propionic acid-ethyl ester, 300 parts of nitrobenzene and 26 parts of potassium carbonate was heated under stirring at about 130° C. for 2 hours, and then 100 parts of 1-amino-2-bromo-4-hydroxy-anthraquinone were added. The temperature of the resulting mixture was then elevated to about 140° C. to carry out reaction with stirring for 25 hours. Upon completion of the reaction, the reaction mixture was cooled and 3.7 parts of acetic acid were added thereto to neutralize excess potassium carbonate, followed by steam distillation to drive off nitrobenzene. A precipitate was filtrated off, washed with methanol, further washed with water and dried to obtain 120 parts of dark red 1-amino-2-(2'-methyl-4'-ethoxycarbonylethylphenoxy)-4-hydroxyanthraquinone.

The product was recrystallized from chlorobenzene to obtain a refined material, which had a melting point from 115° C. to 116° C. showing maximum absorption wave length at 515 mμ and 552 mμ.

The thus obtained dyestuffs dyed, when suspended in a medium containing a dispersing agent, synthetic fibers such as modified polyester fibers at about 125° C. under pressure to brilliant red of good fastness to light and sublimation.

EXAMPLE 4

The same process of Example 3 was followed to effect condensation of anthraquinone compounds indicated under column A and phenol compounds idicated uder column B in the following Table II to obtain 2-substituted phenoxyanthraquinone dyestuffs respectively.

These dyestuffs dyed polyester fibers to red to gluish red shades having good fastness to light and sublimation.

The melting point and maximum absorption wave length of these dyestuffs are shown under columns C and D respectively, and the shades given by the dyestuffs to polyester fibers are shown under column E.

TABLE II

| A | B | C °C. | D mμ | E |
|---|---|---|---|---|
| 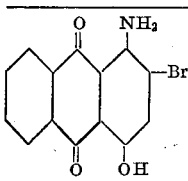 | 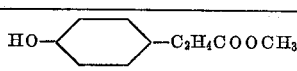 | 143–145 | 515–550 | Brilliant red. |
| 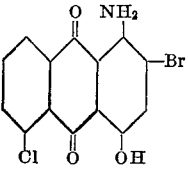 | 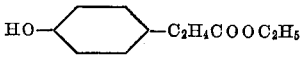 | 150–151.5 | 525–560 | Bluish red. |
| 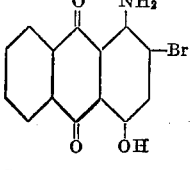 | 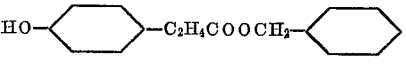 | 105–106 | 516–550 | Brilliant red. |
| Same as above | 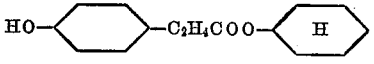 | 154.5–155.5 | 516–550 | Do. |
| 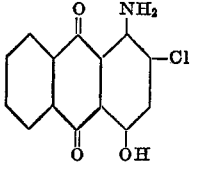 | 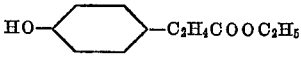 | 132–134 | 515–550 | Do. |
| Same as above | 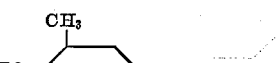 | 150–151 | 515–552 | Do. |
| 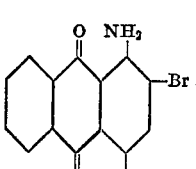 | 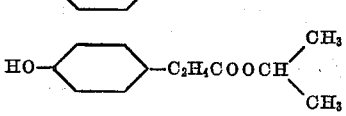 | 112–114 | 516–550 | Do. |
| Same as above |  | 136.5–138.5 | 516–551 | Do. |
| Do | 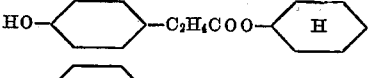 | 114–118 | 514–548 | Do. |
| Do | 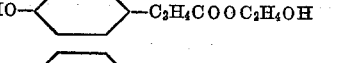 | 159–160 | 518–548 | Do. |
| Do | 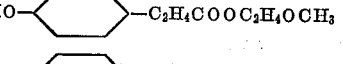 | 122–123 | 518–552 | Do. |
| Do | 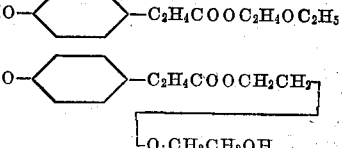 | 101–104 | 517–549 | Do. |

TABLE II

| A | B | C °C. | D mμ | E |
|---|---|---|---|---|
| 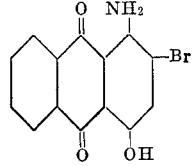 | HO—⬡—C₂H₄COOCH(CH₃)CH₂O—⬡ | 142–144 | 516–548 | Brilliant red. |
| 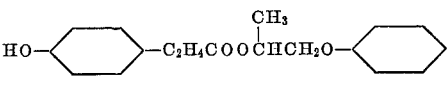 | HO—⬡—C₂H₄COOCH₂CH₂CN | 127–130 | 517–551 | Do. |
| 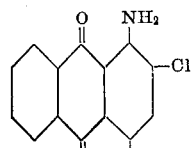 | HO—⬡—C₂H₄COOCH₂CH₂NH₂ | 134–135 | 516–552 | Do. |
| Same as above | HO—⬡—C₂H₄COOCH(CH₃)CH₂OCH₃ | 119–121 | 517–549 | Do. |
| Do | HO—⬡—C₂H₄COOC₂H₄—⬡ | 103–104 | 514–548 | Do. |
| Do | HO—⬡(Cl)—C₂H₄COOC₂H₅ | 160–162 | 516–548 | Do. |
| 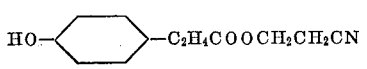 | HO—⬡(CH₃)—C₂H₄COOC₂H₅ | 148–150 | 516–551 | Do. |
| Same as above | HO—⬡—C₂H₄COOCH(CH₃)CH₂O—⬡—CH₃ | 129–131 | 516–550 | Do. |

EXAMPLE 5

A mixture of 1500 parts of ethanol, 300 parts of concentrated sulfuric acid and 100 parts of 1-amino-2-(4'-carbamoylethylphenoxy)-4-hydroxy-anthraquinone was heated under stirring at a temperature from 78° C. to 81° C. for 15 hours. Upon completion of the reaction, the reaction mixture was cooled and a resulting precipitate was filtrated off and washed with water to obtain 107 parts of a red product comprising 1-amino-2-(4'-ethoxycarbonylethylphenoxy)-4-hydroxy-anthraquinone.

This product was suspended in ethanol to yield a refined product, which had a melting point 132–133° C., indicating maximum absorption wave length in an acetone solution at 515 mμ and 550 mμ.

The thus obtained dyestuffs in a dispersion dye synthetic fibers such as polyester fibers at about 120° C. under pressure to brilliant red shades of good fastness to light and sublimation.

EXAMPLE 6

The same process as in Example 5 was followed to effect the reaction of anthraquinone compounds indicated under column A with alcohols indicated under column B in the following Table III, thereby obtaining corresponding 2-substituted-phenoxyanthraquinone dyestuffs.

These dyestuffs dyed polyester fibers to red to bluish red shades of good fastness to light and sublimation.

The melting points, the maximum absorption wave length in acetone solution of the dyestuffs and shades given to polyester fibers by the dyestuffs are shown in the Table III under columns C, D and E, respectively.

10° C., 500 parts of methanol were added thereto, and a resulting precipitate was filtered off. The precipitate was washed with methanol and further washed with water to obtain 90 parts of a red product comprising 1-amino-

TABLE III

| A | B | C °C. | D mµ | E |
|---|---|---|---|---|
| 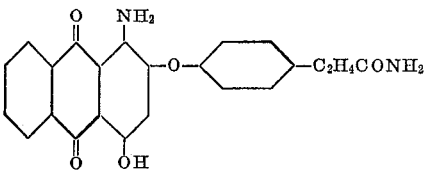 | H$_3$C\\CHOH / H$_3$C | 112–114 | 516–550 | Brilliant red; |
| Same as above | 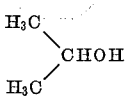 | 154.5–155.5 | 516–550 | Do. |
|  | C$_2$H$_5$OH | 115–116 | 515–552 | Do. |
| Same as above | 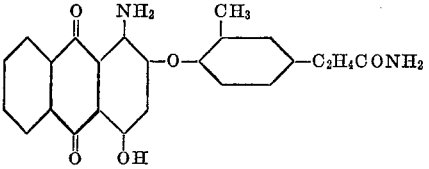 | 136.5–138.5 | 516–551 | Do. |
|  | C$_2$H$_5$OH | 160–162 | 516–548 | Do. |
|  | Same as above | 148–150 | 516–551 | Do. |
| 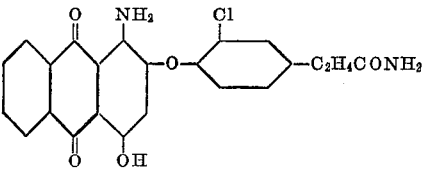 | ----do---- | 150–151.5 | 525–560 | Bluish red; |
|  | 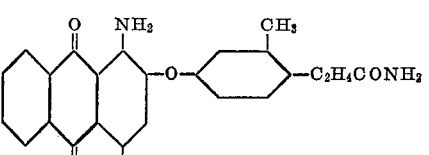 | 103–104 | 514–548 | Brilliant red; |
| Same as above | HOCH$_2$CH$_2$OH | 117.5–118.5 | 514–548 | Do. |
| Do | C$_2$H$_5$OCH$_2$CH$_2$OH | 122–123 | 558–552 | Do. |
| Do | HOC$_2$H$_4$OC$_2$H$_4$OH | 101–104 | 517–549 | Do. |
| Do | CH$_3$OCH$_2$CHOH / CH$_3$ | 119–121 | 517–549 | Do. |
| Do | 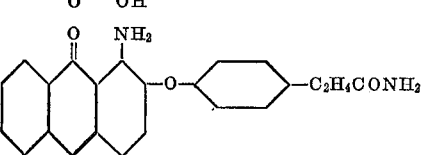 | 129–131 | 516–550 | Do. |

EXAMPLE 7

A mixture of 2000 parts of -methoxyethanol, 50 parts of benzene sulfonic acid and 100 parts of 1-amino-2-(4'-carboxyethylphenoxy) - 4 - hydroxyanthraquinone was heated under stirring for 5 hours while removing water formed during reaction. Upon completion of the reaction, the reaction mixture was cooled to a temperature below 2 - [4' - (β - methoxyethoxy)-carbonylethylphenoxy]-4-hydroxy-anthraquinone. This product was refined by recrystallization from chlorobenzene to yield a final product which had a melting temperature of 159–160° C., showing maximum absorption wave length at 518 mµ and 548 mµ.

The thus obtained dyestuffs in a dispersion dyed synthetic fibers such as polyester fibers at about 100° C.

under atmospheric pressure in the presence of a carrier to brilliant red shades of good fastness to light and sublimation.

EXAMPLE 8

The same process as in Example 7 was followed to react anthraquinone compounds indicated under column A with alcohols indicated under column B in the following Table IV to obtain 2-substituted-phenoxyanthraquinone dyestuffs respectively.

These dyestuffs dyed polyester fibers to brilliant red shades of good fastness to light and sublimation.

The melting point and maximum absorption wave length in methanol of the dyestuffs are shown under columns C and D in the Table IV respectively while the shades given to polyester fibers by the dyestuffs are shown under column E.

The thus obtained dyestuffs in a dispersion dyed under normal pressure at about 80° C. synthetic fibers such as cellulose acetate to bluish red shades of good fastness to light and sublimation.

EXAMPLE 10

The same process as in Example 9 was followed to react anthrequinone compounds indicated under column A with alcohols indicated under column B in the following Table V to obtain 2-substituted phenoxyanthraquinone dyestuffs respectively.

The dyestuffs dyed polyester fibers to brillant red shades of good fastness to light and sublimation.

The melting point and maximum absorption wave length in an acetone solution of the dyestuffs are shown under columns C and D while the shades given to polyester fibers by the dyestuffs are shown under column E.

TABLE V

| A | B | C °C. | D mµ | E |
|---|---|---|---|---|
| 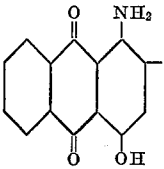—O—⟨ ⟩—C₂H₄CN | CH₃OH | 143-145 | 515-550 | Brilliant red. |
| Same as above | ⟨H⟩—OH | 154.5-155.5 | 516-551 | Do. |

TABLE IV

| A | B | C °C. | D mµ | E |
|---|---|---|---|---|
| —O—⟨ ⟩—C₂H₄COOH | C₂H₅OH | 132-133 | 515-550 | Brilliant red. |
| Same as above | ⟨ ⟩—OCH₂CHOH (CH₃) | 142-144 | 516-549 | Do. |
| 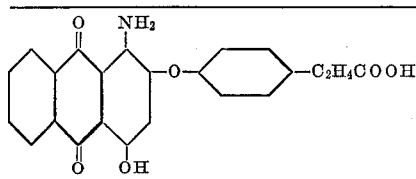—O—⟨ ⟩—C₂H₄COOH | CH₃OH | 150-151 | 515-552 | Do. |

EXAMPLE 9

A mixture of 3000 parts of ethanol, 500 parts of concentrated sulfuric acid and 100 parts of 1-amino-2-(4'-cyanoethylphenoxy) - 4-hydroxy - 5 - chloroanthraquinone was heated under stirring at a temperature from 78 to 80° C. for 10 hours. Upon completion of reaction, the reaction mixture was cooled, and a precipitate as filtered off washed with water and dried to obtain 100 parts of a red product comprising 1-amino-2-(4'-ethoxycarbonylethylphenoxy) - 4 - hydroxy - 5 - chloro-anthraquinone.

This product was suspended in ethanol with stirring to obtain a refined product, which had a melting point of 150 to 151.5% C., showing maximum absorption wave length in an acetone solution at 525 mµ and 560 mµ.

EXAMPLE 11

A mixture of 2000 parts of ethanol, 35 parts of β-naphthalene sulfonic acid and 100 parts of 1-amino-2-(2'-methyl - 4 - carbamoylethylphenoxy)-4-hydroxy-anthraquinone was heated at a temperature from 75° C. to 79° C. under stirring for 15 hours. Upon completion of the reaction, the reaction mixture was cooled. A resulting precipitate was filrated off, washed with methanol, further washed with water and dried to obtain 100 parts of a red product comprising 1-amino-2 - (2'-methyl-4'-ethoxycarbonylethylphenoxy) - 4 - hydroxy - anthroquinone. This product was suspended in ethanol with stirring to obtain a refined product, which had a melting point from 115 to 116° C., showing maximum absorption wave length in an acetone solution at 515 mµ and 552 mµ.

The thus obtained dyestuffs in a dispersion dyed under normal pressure at about 80° C. synthetic fibers such as modified polyester fibers commercially available, as for example, under the brand name "T-89 Fibers" from the Teikoku Jinken K. K., Japan to brilliant red shades of good fastness to light and sublimation.

EXAMPLE 12

1 part of a dyestuff of the following formula:

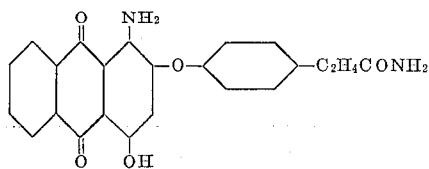

was dispersed in 3000 parts of water containing 2 parts of condensate from naphthalene sulfonic acid and formaldehyde and 4 parts of sulfuric acid ester of high alcohol to make up a dye bath in which 100 parts of polyester fiber were immersed for treatment at 130° C. for 60 minutes. After the treatment, the fiber was washed with water and subjected to soaping in 3000 parts of water containing a sulfuric acid ester of high alcohol at 90° C. for 20 minutes, resulting in dyed material having brilliant red shades of good fastness to light and sublimation.

The light fastness of the dried material was graded 6th to 7th and the sublimation fastness was graded 5th by an iron tester employed at 185° C. for 30 seconds.

EXAMPLE 13

1 part of a dyestuff of the following formula:

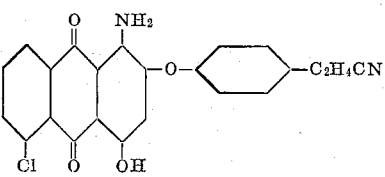

was dispersed in 300 parts of water containing 2 parts of condensate from hydroxy-naphthalene sulfonic acid, cresol and formaldehyde and two parts of condensate from naphthalene sulfonic acid and formaldehyde to make up a dye bath. 5 parts of o-phenyl-phenol were added to the dye bath in which 100 parts of polyester fiber were immersed for treatment at 100° C. for 90 minutes. After the treatment, the fiber was subjected to soaping in 3000 parts of water containing 4 parts of said condensate, resulting in dyed material having bluish red shades of good fastness to light and sublimation. The light fastness of the dyed material was graded 7th and the sublimation fastness was graded 5th by an iron tester employed at 185° C. for 30 seconds.

EXAMPLE 14

The same process as in Example 12 or 13 was followed to effect colouring of polyester fibers by use of the dyestuffs indicated under column A in the following Table VI, thereby giving fibrous materials of shades of such fastness to light (JISL—1044 (1959) Fade-O-meter) as indicated under column B and such fastness to sublimation (Iron tester: 180° C., 30 sec.) as indicated under column C.

TABLE VI

| A | Grade B | C |
|---|---|---|
| anthraquinone-O-phenyl-C₂H₄COOCH₃ | 6-7 | 5 |
| anthraquinone-O-(methylphenyl)-C₂H₄CONH₂ | 6-7 | 5 |
| anthraquinone-O-phenyl-C₂H₄COOC₂H₅ | 6-7 | 5 |
| chloro-anthraquinone-O-phenyl-C₂H₄COOC₂H₅ | 6-7 | 4-5 |
| anthraquinone-O-phenyl-C₂H₄COOCH₂-phenyl | 6-7 | 5 |

TABLE VI—Continued

| A | Grade B | C |
|---|---|---|
| [1-amino-4-hydroxy-anthraquinone-2-yl-O-C₆H₄-C₂H₄CONH-C₆H₅] | 6 | 5 |
| [1-amino-4-hydroxy-anthraquinone-2-yl-O-C₆H₄-C₂H₄COOC₂H₄OCH₃] | 6-7 | 4-5 |
| [1-amino-4-hydroxy-anthraquinone-2-yl-O-C₆H₃(CH₃)-C₂H₄COOC₂H₅] | 6-7 | 4-5 |
| [1-amino-4-hydroxy-anthraquinone-2-yl-O-C₆H₃(CH₃)-C₂H₄COO-C₆H₅] | 6-7 | 5 |
| [1-amino-4-hydroxy-anthraquinone-2-yl-O-C₆H₃(CH₃)-C₂H₄COOC₂H₄-C₆H₅] | 6-7 | 4-5 |

EXAMPLE 15

1 part of a dyestuff of the following formula:

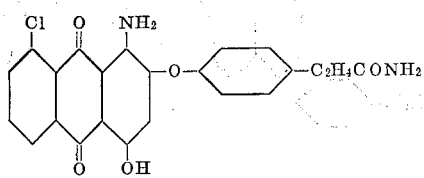

was dispersed in 3000 parts of water containing 3 parts of condensate from naphthalene sulfonic acid and formaldehyde and 5 parts of Marseilles soap to make up a dye bath in which 100 parts of cellulose acetate were immersed for treatment at 80° C. for 60 minutes.

After the treatment, the cellulose acetate was washed with water and subjected to soaping in 3000 parts of water containing 5 parts of Marseilles soap, resulting in dyed material of bluish red shades of good fastness to light and sublimation. The light fastness was graded 7th and the sublimation fastness (120° C., 5 hours) was graded 5th.

EXAMPLE 16

1 part of a dyestuff of the following formula:

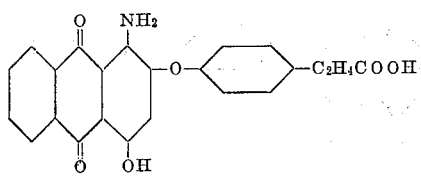

was dispersed in 3000 parts of water containing 3 parts of condensate from naphthalene sulfonic acid and formaldehyde and 4 parts of a sulfuric acid ester of high alcohol to make up a dye bath in which 100 parts of cellulose acetate were immersed for treatment at 80° C. for 60 minutes. After the treatment, the cellulose acetate was subjected to soaping in 3000 parts of water containing 4 parts of the said condensate, resulting in dyed material of brilliant red shades of good fastness to light and sublimation.

The light fastness was graded 6th and the sublimation fastness (120° C., 5 hours) was graded 5th.

EXAMPLE 17

The same process as in Example 15 or 16 was followed employing the dyestuffs as indicated under column A in the following Table VII to dye cellulose acetate in shades of such fastness to light as indicated under column B and of such fastness to sublimation (120° C., 5 hours) as indicated under column C.

TABLE VII

| A | Grade B | Grade C |
|---|---|---|
| (anthraquinone with Cl, O, NH$_2$, OH; —O—C$_6$H$_4$—C$_2$H$_4$CONH$_2$) | 6–7 | 5 |
| (anthraquinone with O, NH$_2$, OH; —O—C$_6$H$_4$—C$_2$H$_4$CONHC$_4$H$_9$) | 5 | 4–5 |
| (anthraquinone with Br, O, NH$_2$, OH; —O—C$_6$H$_4$—C$_2$H$_4$COOC$_2$H$_5$) | 6–7 | 5 |
| (anthraquinone with O, NH$_2$, OH; —O—C$_6$H$_4$—C$_2$H$_4$CONH—C$_6$H$_5$) | 5 | 5 |

EXAMPLE 18

1 part of a dyestuff of the following formula:

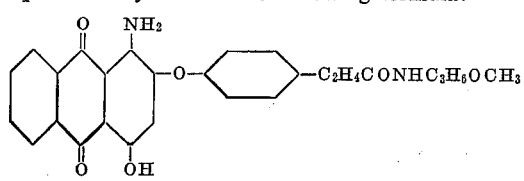

was dispersed in 3000 parts of water containing 3 parts of condensate from naphthalene sulfonic acid and formaldehyde and 2 parts of alkylbenzene sulfonic acid sodium salt to make up a dye bath in which 100 parts of polyamide fiber were immersed for treatment at 100° C. for 90 minutes. After the treatment, the fiber was subjected to soaping in 3000 parts of water containing 4 parts of the said condensate, resulting in a dyed material of brilliant red shades having good fastness to light and sublimation.

The light fastness was graded 5th to 6th and the sublimation fastness (150° C., 120 sec.) was graded 5th.

EXAMPLE 19

1 part of a mixture comprising approximately in the proportion 1 to 1 the dyestuffs (1) and (2) as indicated by the following formulae:

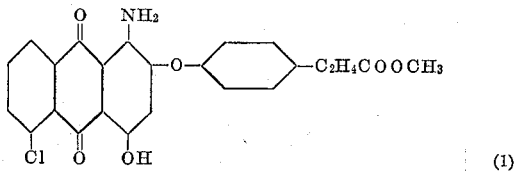

was dispersed in 3000 parts of water containing 2 parts of condensate from naphthalene sulfonic acid and formaldehyde and 2 parts of alkylbenzene sulfonic acid sodium salt to make up a dye bath in which 100 parts of polyester ether fiber were immersed for treatment at 100° C. for 120 minutes.

After the treatment, the fiber was subjected to soaping in 3000 parts of water containing 4 parts of said condensate, resulting in a dyed material given bluish red shades of good fastness to light and sublimation. The light fastness was graded 6th to 7th and the sublimation fastness (Iron tester: 185° C., 30 sec.) was graded 5th.

What is claimed is:
1. Disperse anthraquinone dyestuffs as indicated by the formula:

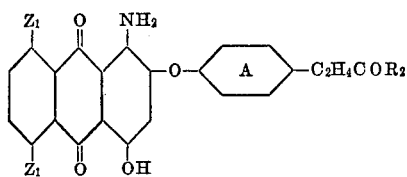

in which A is a benzene nucleus which may have a substituent selected from the class consisting of chlorine and methyl; $R_2$ denotes ethoxy, methoxy, cyclohexyloxy, isopropoxy, and phenethyloxy; and at least one of the $Z_1$'s being hydrogen and the other being hydrogen, chlorine or bromine.

2. Disperse anthraquinone dyestuff as indicated by the formula:

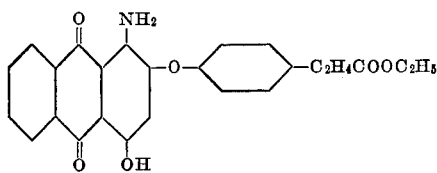

3. Disperse anthraquinone dyestuff as indicated by the formula:

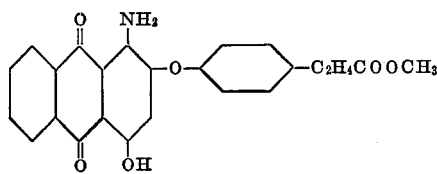

4. Disperse anthraquinone dyestuff as indicated by the formula:

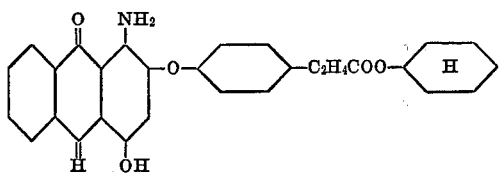

5. Disperse anthraquinone dyestuff as indicated by the formula:

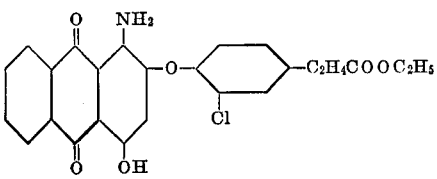

6. Disperse anthraquinone dyestuff as indicated by the formula:

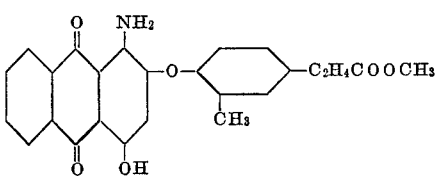

7. Disperse anthraquinone dyestuff as indicated by the formula:

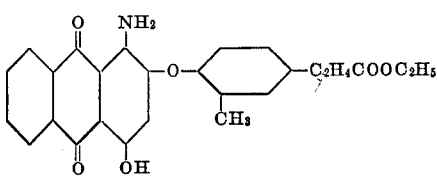

8. Disperse anthraquinone dyestuff as indicated by the formula:

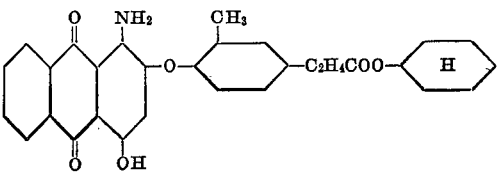

References Cited
UNITED STATES PATENTS

| | | | |
|---|---|---|---|
| 3,264,325 | 8/1966 | Lewis | 260—380 |
| 3,270,013 | 8/1966 | Hindermann et al. | 260—247.1 |
| 3,284,473 | 11/1966 | Ramanthan | 260—376 |
| 3,329,692 | 7/1967 | Ramanthan | 260—380 |
| 3,390,946 | 7/1968 | Staub et al. | 260—377 XR |

LORRAINE A. WEINBERGER, Primary Examiner

E. J. SKELLY, Assistant Examiner

U.S. Cl. X.R.

8—39, 40; 260—247.2, 379, 380